US009794612B1

(12) United States Patent
Lam et al.

(10) Patent No.: US 9,794,612 B1
(45) Date of Patent: Oct. 17, 2017

(54) METHOD AND SYSTEM FOR COMMUNICATING CUSTOMER SERVICE REQUESTS

(75) Inventors: Thai Lam, Torrance, CA (US); Daryl G. Messenger, Inglewood, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 1227 days.

(21) Appl. No.: 12/482,167

(22) Filed: Jun. 10, 2009

(51) Int. Cl.
*H04N 21/41* (2011.01)
*H04N 21/418* (2011.01)
*H04N 21/435* (2011.01)
*H04N 21/266* (2011.01)

(52) U.S. Cl.
CPC ... *H04N 21/4181* (2013.01); *H04N 21/26606* (2013.01); *H04N 21/435* (2013.01)

(58) Field of Classification Search
None
See application file for complete search history.

(56) References Cited

U.S. PATENT DOCUMENTS

| 6,853,728 | B1 * | 2/2005 | Kahn et al. | 380/239 |
| 8,255,960 | B2 * | 8/2012 | Yu | H04N 7/17318 |
| | | | | 725/86 |
| 2002/0031120 | A1 * | 3/2002 | Rakib | 370/386 |
| 2003/0156218 | A1 * | 8/2003 | Laksono | 348/388.1 |
| 2004/0039742 | A1 * | 2/2004 | Barsness et al. | 707/10 |

* cited by examiner

*Primary Examiner* — Cai Chen
(74) *Attorney, Agent, or Firm* — Harness, Dickey & Pierce, PLC

(57) ABSTRACT

A communication system and method of operating the same includes a conditional access module and a customer service module customer service request signal. A handler receives the customer service request signal. The handler determines a communication path to the conditional access module through a connection pool and assigns the communication path for the customer service request signal. The handler communicates the request through the communication path and returns the path to the connection pool when communicating is complete.

22 Claims, 5 Drawing Sheets

METHOD AND SYSTEM FOR COMMUNICATING CUSTOMER SERVICE REQUESTS

TECHNICAL FIELD

The present disclosure relates generally communicating between a service provider and a user device, and, more specifically, to communicating a customer service request such as conditional access to a user device such as a set top box.

BACKGROUND

The statements in this section merely provide background information related to the present disclosure and may not constitute prior art.

Consumers increasingly desire access to various types of content, including music, videos, games, and the like. To meet these needs, content providers are increasingly investigating ways to provide content in a timely manner to consumers.

Satellite distribution systems are one way in which to provide content to various consumers. Pay-per-view and regular broadcasts are available in a satellite system. In a pay-per-view system, access is provided to users for a particular program that is watched by more than one user at the same time. Recording devices in the user devices may be used to store the content for later playback.

In certain situations, a user may desire access to content not available during a regular broadcast. Providing the user with a program on an individual basis, consumes valuable satellite resources. Therefore, it may be desirable to provide other means for distributing content when needed to various customers. Providing content and various services to users is important for service providers. Securely allowing user devices to access content or perform tasks is performed using a conditional access packet. The service provider includes a conditional access system that is used to provide security. There may be many processes that require conditional access. Typically, the conditional access system provides a one-to-one interface with a process requiring conditional access. Various processes may be busier than others and thus resources may not be used in an efficient manner. For example, some processes may be over-committed and thus may have to wait while others may be idle.

SUMMARY

The present disclosure sets forth a handler system within the service provider that allows efficient communication between the subscriber transaction system and the conditional access system.

In one aspect of the disclosure, a method includes communicating a customer service request signal to a handler, determining a communication path from the handler to a conditional access module through a connection pool, assigning the communication path for the customer service request signal, communicating the request through the communication path, when communicating is complete, returning the path to the connection pool.

In a further aspect of the disclosure, a communication system includes a conditional access module and a customer service module customer service request signal. A handler receives the customer service request signal. The handler determines a communication path to the conditional access module through a connection pool and assigns the communication path for the customer service request signal. The handler communicates the request through the communication path and returns the path to the connection pool when communicating is complete.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
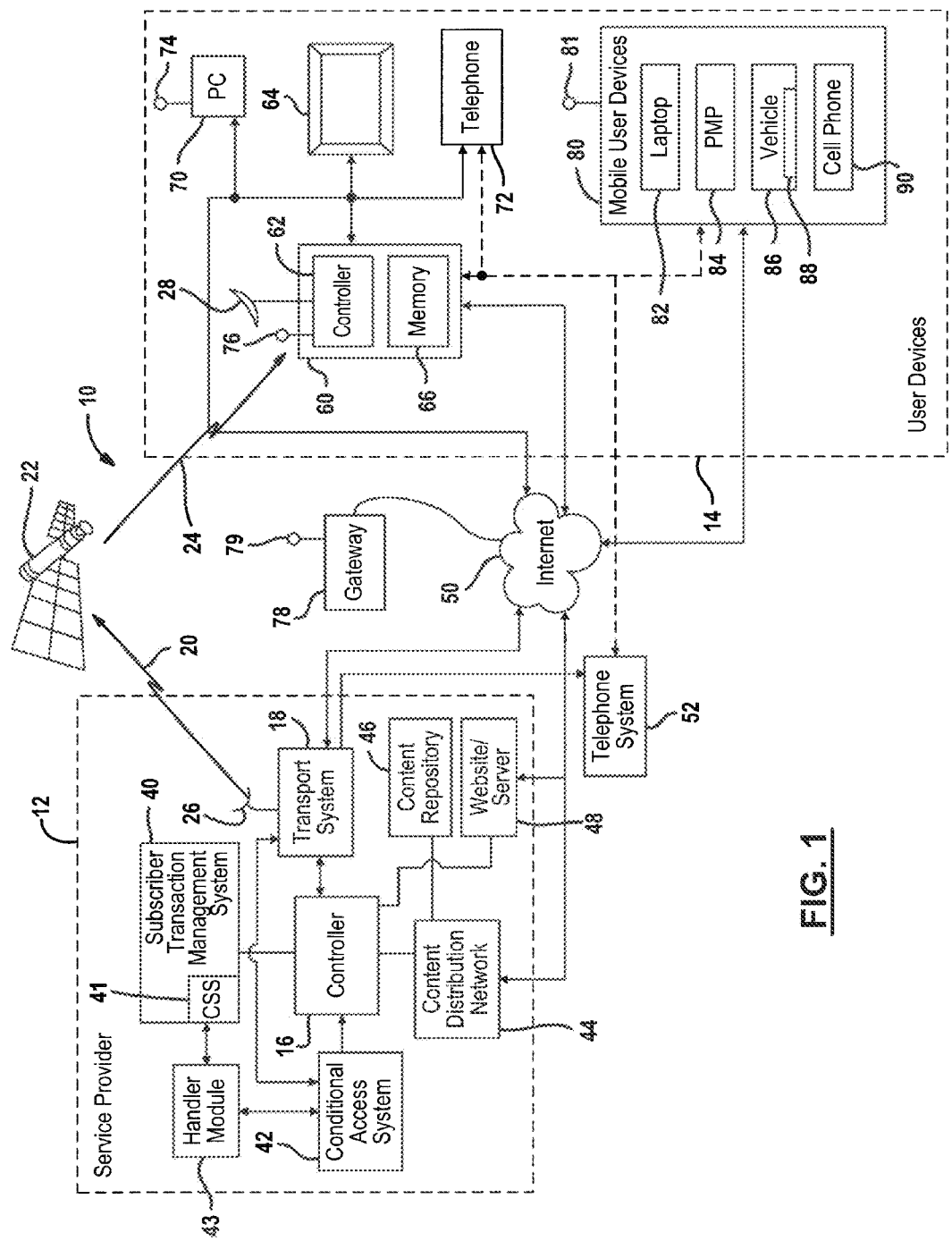
FIG. 1 is a block diagrammatic system view of a communication system according to the present disclosure.

The following description is merely exemplary in nature and is not intended to limit the present disclosure, application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure.

While the following disclosure is made with respect to example DIRECTV® broadcast services and systems, it should be understood that many other delivery systems are readily applicable to disclosed systems and methods. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a service provider and integrated receiver/decoders (IRDS) as described below can be reallocated as desired without departing from the intended scope of the present patent.

Further, while the following disclosure is made with respect to the delivery of content (e.g., television (TV), movies, games, music videos, etc.), it should be understood that the systems and methods disclosed herein could also be used for delivery of any media content type, for example, audio, music, data files, web pages, games, etc. Additionally, throughout this disclosure reference is made to data, information, programs, movies, assets, video data, etc., however, it will be readily apparent to persons of ordinary skill in the art that these terms are substantially equivalent in reference to the example systems and/or methods disclosed herein. As used herein, the term title or program will be used to refer to, for example, a media content type such as a movie itself and not the name of the movie.

Referring now to FIG. 1, a communication system 10 includes a service provider 12 that communicates content to user devices 14. The service provider 12 may include a controller 16 that is used to control the overall operation of the system. The controller 16 and some of the associated modules and components may be referred to as a head end. A transport system module 18 is used to generate and communicate communication signals to the user devices 14. In one example, the transport system module 18 generates uplink signals 20 and communicates them to satellite 22. Satellite 22 generates downlink signals 24 to one or more user devices 14. An antenna 26 associated with the transport system module 18 is used to generate the uplink signals 20. A downlink antenna 28 associated with the user device 14 is used to receive downlink signals.

Various types of content or program signals and security information signals, but not limited to security information, encryption-decryption information, digital rights management information, purchase information packets (PIPs), conditional access packets (CAPs), channel or content access lists or rights may be communicated through the communication system 10. It should also be noted that various content may be encrypted based upon a control word (CW) known to the service provider and/or the various user devices. Control word packets (CWPs) may include, among other things, authorization requirements, a time stamp and an input value for computing the control word by a decryption or a cryptographic hash of the contents. The control word packets may, from time to time, be transmitted from the service provider through the satellite to the user devices.

The service provider 12 may also include a subscriber transaction management system 40. The subscriber transaction management system (STMS) 40 has the function of a billing system. The STMS 40 keeps track of various transactions and the services to which the various user devices are subscribed to. Billing information and enabling access to a system may be provided through the subscriber transaction management system. The STMS 40 may include a customer service segment module 41 that communicates customer service request signals to a conditional access system 42.

A conditional access management center or system (CAMC) 42 may also be coupled to controller 16. The conditional access system 42 generates conditional access packets that may be provided through the satellite or through other communication networks to the user devices 14. The conditional access packet may be targeted for a particular user device to allow the user device to access a service or perform some action. The conditional access packet may be generated in response to the customer service request signal. The conditional access system 42 may, for example, generate the CAPs, PIPs and CWPs described above.

A handier module 43 may be used to control the communication between the conditional access system 42 and the customer service segment module 41 of the subscriber transaction management system 40. The handler module 43 will be described further below in FIGS. 2-5.

A content distribution network 44 may also be coupled to controller 16. The content distribution network 44 in conjunction with a content repository 46 may be used to provide content through the satellite and through the various other networks. The content distribution network 44, although illustrated entirely within the service provider, may also be outside or partially outside the service provider 12. That is, user devices 14 may be provided access to content from various sources directly once authorized by the service provider. A pay television service may provide content to a user device directly once all the security safeguards have been met.

A website or server 48 may also be coupled to the controller 16. The website 48 may provide to the user devices 14 a way in which to enable, to subscribe to a service or to request an action. The use of the various components within the service provider 12 will become evident in the description below.

The conditional access system 42, the content distribution network 44, and the website 48 may all be coupled to the Internet 50. The Internet 50 may be reached through various types of networks, including, but not limited to, a wireless network, a broadband network, a broadband wireless network, a Wifi network, a WiMax network and an optical fiber network.

A telephone system 52 may also be used to communicate between the user device 14 and the service provider 12. The telephone system 52 may include a cellular system that is for the most part wireless or a public switched telephone network (PSTN). In particular the conditional access system 42 may communicate conditional access signals or packet to the user device 14.

One example of a user device 14 includes a fixed user device such as a set top box 60. The set top box 60 may have various components such as a controller 62 that is used to control the operation of the system and generate and provide the content to the display device 64 such as a television. The set top box 60 may also be referred to as integrated receiver decoder (IRD). The set top box 60 may decode, decompress, depacketize, and demultiplex the content received from the satellite 22. Also, any content received from the Internet 50 may also be decoded, demultiplexed, decompressed and depacketized, if needed. Output drivers, contained within the controller, may be used to control the audio and visual function of the display 64.

The set top box 60 may also include a memory 66. The memory 66 may, for example, be a digital video recorder (DVR) such as a hard disk drive. The memory 66 may also be various other types of memory including flash memory. The memory 66 may be used to store content or programs received from the service provider 12 through the satellite 22 or through the Internet 50.

The user device 14 associated with the set top box 60 may also include or be associated with a personal computer 70. The personal computer 70 may be used to provide Internet access for the set top box 60 so that various content may be downloaded from the Internet 50 and from the service provider 12. More specifically, content from the content repository 46 may be provided through the content distribution network 44 through the Internet 50 and stored on the memory 66 of the set top box 60. The personal computer 70 may be used to form the network between the set top box 60 and the Internet 50. The connection between the personal computer 70 and the set top box 60 may be a wired or wireless connection. Of course, if the connection is a wireless connection, a wireless LAN and thus a wireless router may be associated or included within the personal computer 70. An antenna 74 on the PC 70 represents a potential wireless connection to antenna 76 on the set top box 60. The antenna 76 on the set top box 76 may also communicate to an outside wireless router, such as in a Wimax or WiFi system.

A gateway 78 may be used to form access to the Internet in a WiFi or WiMax system through antenna 79. A telephone 72 may also be used to communicate with the various modules within the service provider 12. The telephone 72 may be used to initiate service by the user who communicates directly with an operator or a menu system at the service provider 12. Part of the information received from the satellite 22 may include a program guide that includes various selections therein. The program guide may include selections for selecting a service such as a broadband video download service. This will be further described below.

The user devices 14 may also include mobile user devices 80. The mobile user devices 80 may include the functionality described above with respect to the set top box 60 such as a controller, a memory, an antenna 81 for communicating with the satellite and communicating through the wireless network. Although one antenna 81 is shown, more than one may be used to receive the wireless network signals and the satellite signals. The antenna 81 is shown generally. The antenna 81 may be incorporated within each device. However, mobile user devices 80 may communicate wirelessly through the Internet 50, through a telephone system 52, such as a cellular system, through the Internet, a WiFi, WiMax, other type of wireless systems or more than one type of wireless system. The wireless communications may communicate content or programs as well as provide callbacks from the mobile user devices 80 to the service provider 12. The call backs may include a request for content. The call backs may also include report back of programs that have been viewed or pay-per-view programs that have been purchased. Confirmation signals may also use the Internet 50 or the telephone system 52 as will be further described below. It should also be noted that a different network may be used to communicate program content and other communications between the service provider 12 and the user devices 14 including the mobile user devices 80.

The mobile user devices 80 may include many different devices, including a laptop computer 82, a portable media player 84, a vehicle such as an automotive vehicle that includes a mobile set top box 88 and a cell phone 90. The cell phone 90 may include such devices as a personal digital assistant. It is important that all of the mobile user devices 80 include some form of wireless communication system to receive content from the service provider 12.

Figure 2:
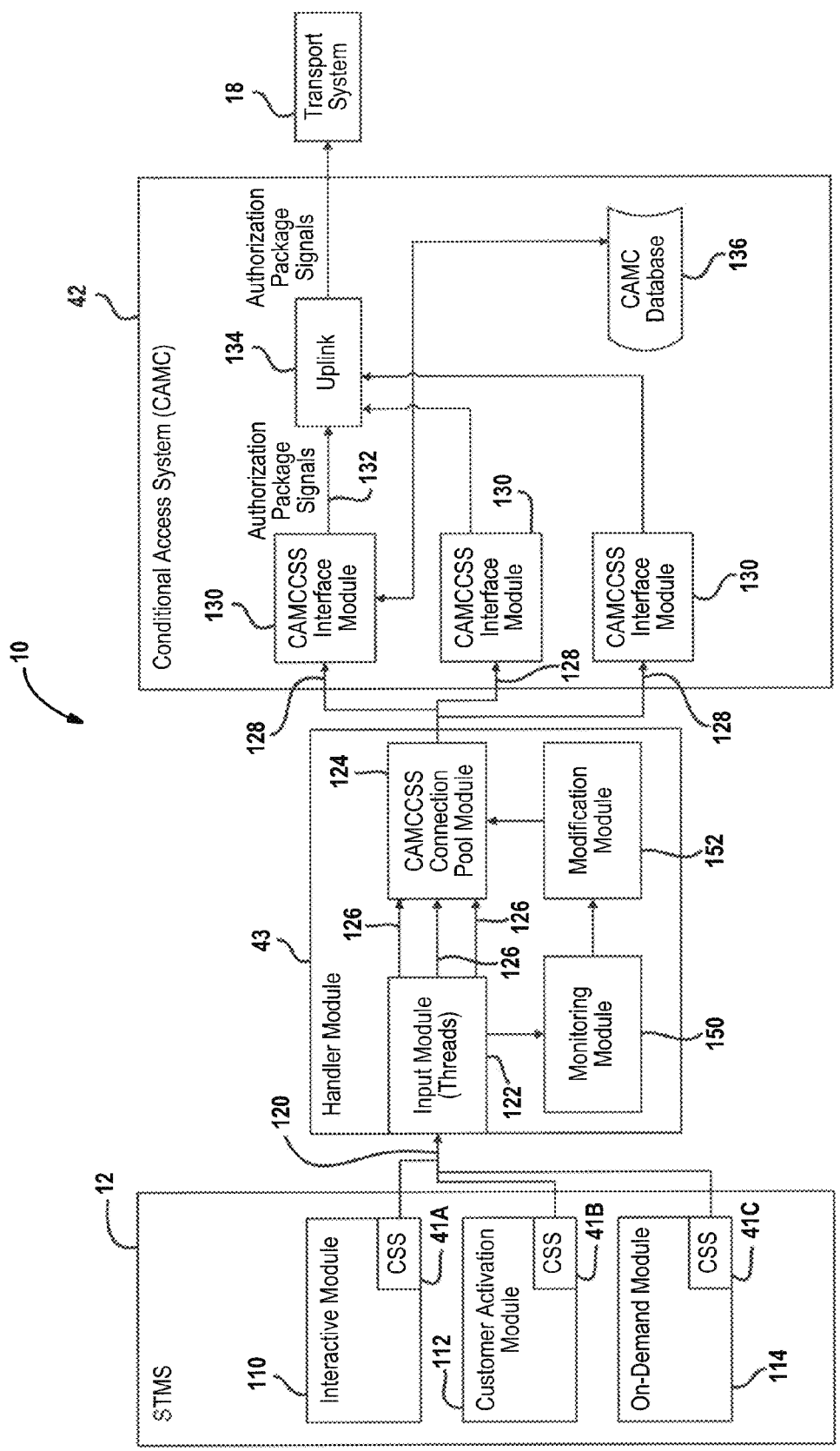
FIG. 2 is a detailed block diagrammatic view of the interaction between the subscriber transaction management system, the handling module and the conditional access system.

Referring now to FIG. 2, the communication system 10 is illustrated in further detail. The subscriber transaction management system (STMS) may include a plurality of modules that may include but are not limited to an interactive module 110, a customer activation module 112 and an on-demand module 114. Of course, various other modules may also be included within the STMS 40. The interactive module 110 may control interactive services to the user devices. The customer activation module 112 may provide activation for initial services as well as additional services once a user device has been established within the communication system. The on-demand module 114 may provide on-demand services to the user devices 42.

The interactive module 110 may include a customer service segment 41A. The customer activation module 112 may include a customer service segment 41B. The on-demand module 114 may include a customer service segment 41C. In prior systems, the customer service segment communicated directly with a CAMCCSS interface module within the conditional access system 42 regardless of the loading. In the present disclosure, the customer service segments 41A-41C communicate with the handler module 43. In particular, the customer service segments communicate with a port 120 within an input module 122 within the handler module 43. The input module 122 may communicate directly with the port 120 to receive various customer service requests from the customer service segments 41A-C.

The input module 122 may generate a thread for each customer service request. The threads may each be connected to a connection pool module 124. The connection tool module 124 provides the connections to the interface to interface module 130 of the conditional access system. Various numbers of interface modules 130 may be provided. Upon receiving a thread 126 from the input module, the connection pool module determines a connection path 128 to an interface module 130. The communication path is assigned for the customer service request signal contained within the thread 126. The thread 126 is dedicated to the customer service request signal until the customer service request signal is completely communicated. When the communication is complete, the communication path is returned to the connection pool.

The interface modules 130 may generate an authorization package signal 132 that is communicated to an uplink module 134. The authorization package signal 132 may be generated using a conditional access system database 136. The database 136 may have specific customer data including the type of transport system to use to communicate the data thereto. The database 136 may also include serial numbers or other identifiers that are communicated to the transport system 18. The authorization package signals are uplinked through a transport system 18. In this example, the word uplink is used for communicating to the transport systems that may include a satellite. Of course, the authorization package signals may be communicated through a telephone system 52 or a broadband network such as the Internet 50 illustrated in FIG. 1.

Referring back to the handler module 43, a monitoring module 150 may monitor the various customer service request signals 150. The monitoring module 150 may determine whether modification of the signals may take place. A modification module 152 may be used to modify the various threads containing the customer service request. The monitoring module 150 may, for example, monitor for duplicate customer service request signals. When duplicate customer service request signals are generated at a customer service request module, they may be deleted from the system. Thus, the modification module may delete a duplicate customer service request signal so that resources within the conditional access system are not used unnecessarily.

The monitoring module 150 may also contain logic for prioritizing the customer service request. Some customer service requests, such as those for high-paying service or allowing a customer to quickly retain service, may be provided.

The modification module 152 may be used to add signals into the system. For example, an additional test or function to be performed by the set top box may be provided. The additional signal may force the user device to perform a function such as a service check or other function.

Figure 3:
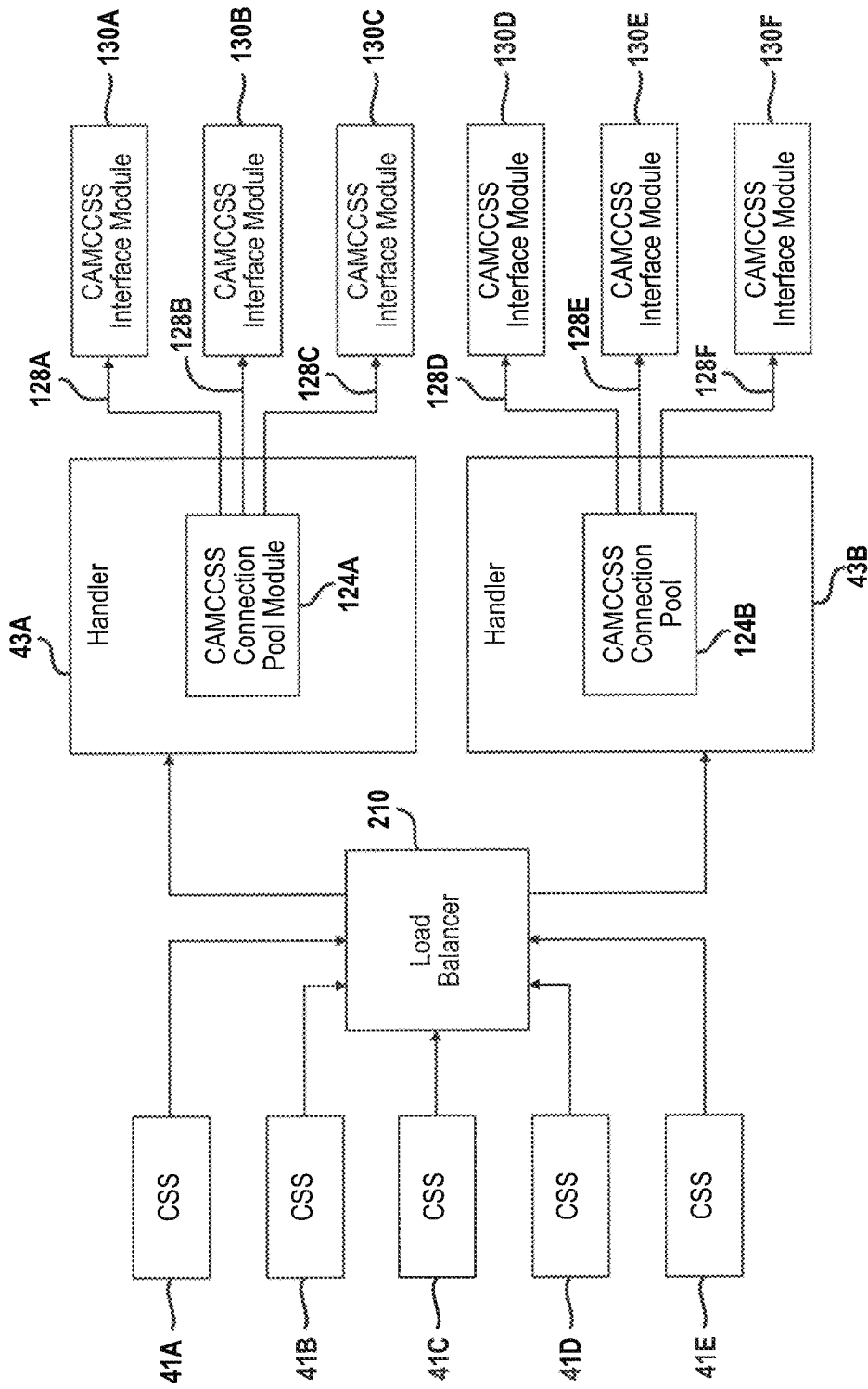
FIG. 3 is an alternative block diagrammatic view, including a load balancer.

Referring now to FIG. 3, when a plurality of customer service segments 41A-44E are provided, more than one handler 43A, 43B may be provided. Each handler may include a pool module 124A, 124B for generating communication paths 128A-128F. The customer service segments 48A-44E may be used the same as those set forth above within the STMS 12. The handlers 43A, 43B may also be identical to those above with respect to the handler module 43 of FIG. 2. Likewise, the interface module 43A may be part of a conditional access system 42 such as that illustrated in FIG. 2. A load balancer 210 may be provided between the customer service segments 41A-E and the handler 43A-B. The load balancer 210 may distribute the load between the handlers 43A-43B so that the load is balanced. The load may be balanced in various ways including the amount of data or the amount of signals. The load balancer 210 may balance a data load of the first handler 43A with the data load of the second handler 43B.

Figure 4:
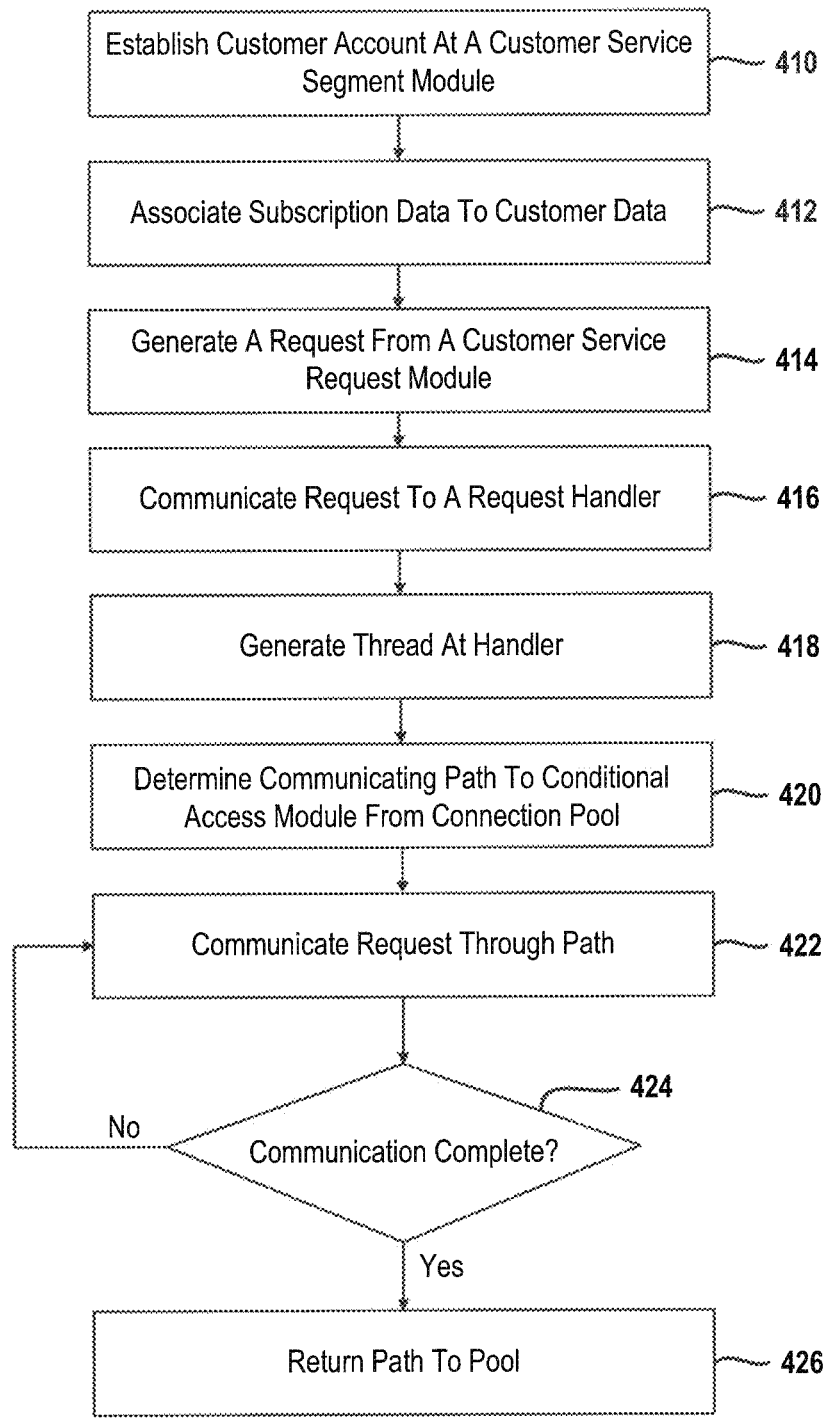
FIG. 4 is a method for operating the communication system.

Referring now to FIG. 4, a method for operating the handler module and communicating between a customer service segment and a conditional access system is set forth. In step 410, a customer account at a customer service segment module is established. The customer account may be established when a subscriber first enters the system. Customer service data associated with a customer may include the different subscriptions subscribed to, the location of the person, billing information and user device identifiers. In step 412, subscription data is associated with the customer data. Subscription data may be changed as new services are offered. In step 414, a request from a customer service request module is generated. The customer service request may include various types of requests, including activation of a service, the ordering of on-demand content or establishing an on-demand content account, or interactive accounts. Adding in other types of services may also require a customer service request.

In step 416, the customer service request is communicated to a request handler module. A thread is generated from the input module of the handler module to a connection pool module. In step 420, the connection pool module 124 of FIG. 2 determines a communication path to the conditional access module from the connection pool and thus from the handler module. In step 422, the customer service request is communicated through the established communication path. The communication path is dedicated to communicating the customer service request to the conditional access system. As illustrated above, the communication request may be communicated to an interface module 130 of the conditional access system as illustrated in FIG. 2.

In step 424, it is determined whether or not the communication is complete. When the communication request has not been communicated fully to the communication access system, the path remains open in step 422 until the communication is complete. In step 424, when the communication is complete, the communication path is returned to the connection pool. The communication path may then be allocated to another customer service request.

Figure 5:
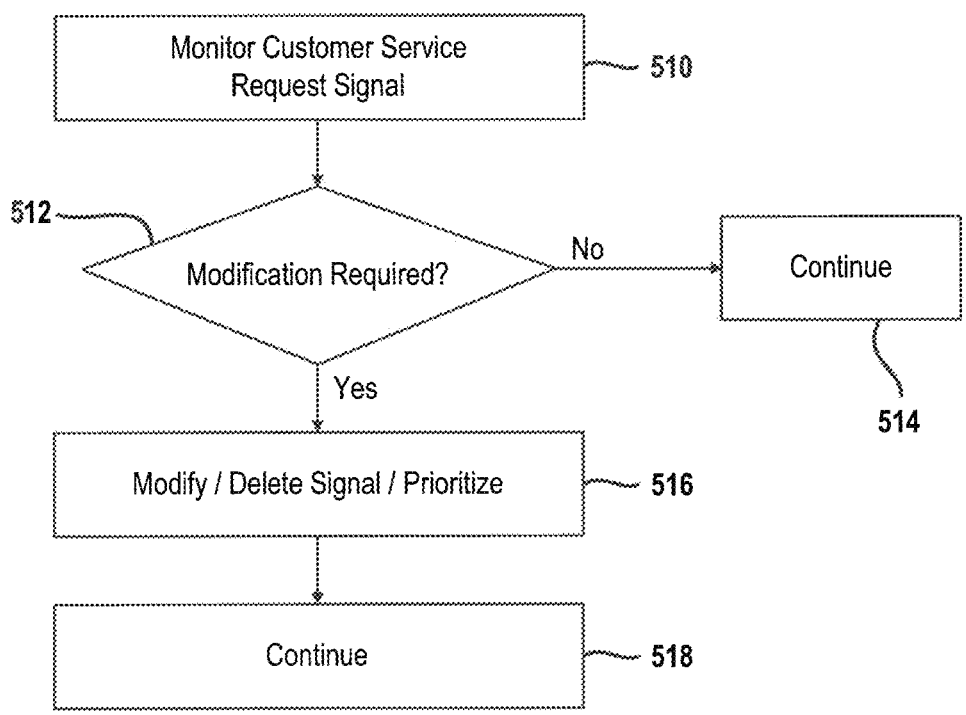
FIG. 5 is a method for modifying a request while operating the communication system.

Referring now to FIG. 5, before determining a communication path, the customer service request signal may be monitored by the monitoring module 150 illustrated in FIG. 2. The customer service request signal may be monitored to determine if a modification is required. In step 512, if a modification is not required, the system continues to step 420 of FIG. 4 in step 514 which establishes a communication path from the connection pool.

In step 512, if a modification is required, step 516 modifies the signal. In step 516, the modification of the signal may replace a customer service request with a second customer service request that has been modified. The modification may add data to a signal which corresponds to a command. The signal may be deleted if the customer service request signal is a duplicate signal. The signal may also be prioritized so that higher priority signals are communicated first and lower customer service request signals are communicated after the higher priority signals. In step 518, the system continues with step 420 of FIG. 4.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method comprising:
   communicating a customer service request signal to a handler at a service provider in response to a user request;
   determining a communication path from the handler to a conditional access module of the service provider from a connection pool, said connection pool comprising a finite plurality of communication paths for communicating customer service request signals therethrough;
   assigning the communication path for the customer service request signal at the handler;
   communicating the customer service request signal through the communication path from the handler to the conditional access module of the service provider; and
   when communicating the customer service request signal is complete, returning the communication path, by the handler, to the connection pool; and
   reallocating the communication path to another customer service request.

2. A method as recited in claim 1 further comprising generating a conditional access signal from the request signal.

3. A method as recited in claim 2 further comprising communicating the conditional access signal to a user device through a transport system.

4. A method as recited in claim 3 further comprising enabling a service at the user device in response to communicating the conditional access signal to a user device through a transport system.

5. A method as recited in claim 3 wherein communicating the conditional access signal to a user device through a transport system comprises communicating the conditional access signal to a user device through at least one of a broadband network, a cellular network, a WiFi network and a WiMax network.

6. A method as recited in claim 1 wherein communicating a customer service request signal to a handler comprises communicating the customer service request signal to the handler from a customer service module.

7. A method as recited in claim 1 wherein communicating a customer service request signal to a handler comprises communicating a plurality of customer service request signals to the handler from a plurality of customer service modules.

8. A method as recited in claim 7 further comprising prioritizing the plurality of customer service requests within the handler.

9. A method as recited in claim 7 wherein communicating a customer service request signal to a handler comprises communicating a plurality of customer service request signals to a plurality of handlers from a plurality of customer service modules through a load balancer and further comprising load balancing the plurality of customer service request signals through the load balancer.

10. A method as recited in claim 1 wherein prior to determining a communication path, modifying the request.

11. A method as recited in claim 10 wherein modifying the request comprises prioritizing the request.

12. A method as recited in claim 10 wherein modifying the request comprises adding a function to the request.

13. A communication system comprising:
a conditional access module of a service provider;
a customer service module of the service provider generating a customer service request signal in response to a user request; and
a handler of the service provider that receives the customer service request signal, said handler determines a communication path to the conditional access module through a connection pool, said connection pool comprising a finite plurality of communication paths for communicating customer service request signals therethrough, assigns the communication path for the customer service request signal and communicates the customer service request signal through the communication path to the conditional access module, said handler returns the communication path to the connection pool when communicating is complete and reallocates the communication path to another customer request.

14. A communication system as recited in claim 13 wherein the conditional access module generates a conditional access signal from the request signal.

15. A communication system as recited in claim 14 further comprising a transport system that communicates the conditional access signal to a user device.

16. A communication system as recited in claim 15 wherein said conditional access signal enables a service at the user device.

17. A communication system as recited in claim 13 wherein the customer service module comprises a plurality customer service modules that generate a plurality of customer service request signals.

18. A communication system as recited in claim 17 wherein the handler prioritizes the plurality of customer service request signals.

19. A communication system as recited in claim 17 wherein the handler deletes one of the plurality of customer service request signals.

20. A communication system as recited in claim 17 further comprising a plurality of handlers and a load balancer receiving a plurality of customer service request signals and load balancing the plurality of customer service request signals.

21. A communication system as recited in claim 17 wherein the handler modifies at least one of the plurality of customer service request signals.

22. A communication system as recited in claim 17 wherein the handler adds a function to the plurality of customer service request signals.

* * * * *